United States Patent Office 3,723,281
Patented Mar. 27, 1973

3,723,281
BICARBONATE ION SENSITIVE ELECTRODE
Warren M. Wise, Corning, N.Y., assignor to Corning Glass Works, Corning, N.Y.
Filed Jan. 31, 1972, Ser. No. 222,023
Int. Cl. G01n 27/46
U.S. Cl. 204—195 L
3 Claims

ABSTRACT OF THE DISCLOSURE

Electrode for measuring the concentration of bicarbonate ions in the presence of chloride ions in an aqueous solution. The ion sensing portion of the electrode is an organic solution consisting of a high molecular weight quaternary ammonium salt dissolved preferably in a dual solvent system consisting of a trifluoroacetyl-p-alkylbenzene and an alcohol of low water solubility. The preferred electrode has a selectivity for $HCO_3^-$ over $Cl^-$ of between about 15 to 1 and 40 to 1.

BACKGROUND OF THE INVENTION

Field of the invention

This invention is in the field of electrodes which can measure the concentration of ions in an aqueous solution. Such ion sensitive electrodes are well known and have been designed to measure the concentration of such cations as $H^+$, $Na^+$, $K^+$, $Ag^+$, $Cu^+$, and $Ca^{+2}$ as well as anions such as $F^-$, $Cl^-$, $Br^-$, $I^-$, and $NO_3^-$. More specifically, the present invention is in the field of ion selective electrodes having a liquid organic ion sensing phase which is able to sense one or more specific ions in preference to others. The electrodes housing such organic sensing phases are commonly referred to as liquid organic ion-exchange electrodes or simply, sensor electrodes.

In using sensor electrodes to measure ion concentrations, two electrodes are used—the sensor electrode and a reference electrode. The two electrodes are typically connected electrically to a high impedance potentiometer or electrometer and then immersed in an aqueous test solution. Depending on the construction of the sensor electrode, and the extent of ionic activity in the test solution, an electrochemical cell may develop. The poential of this cell can be read on the electrometer. Since EMF is a function of ion activity, and ion activity can be related to ion concentration, the potential reading can be translated into a measure of ion concentration in a given test solution.

The preference of a sensor electrode for measuring the activity of certain ions over others is referred to as the selectivity of the sensor electrode. This selectivity is governed by the tendency of the ion sensitive portion to sense given test ions over other ions at the same concentration. Selectivity is generally determined by the composition of the sensor phase portion of the electrode. Thus, if the sensor phase (or sensitive portion) of the sensor electrode is of such a composition as to sense more readily the test ion activity, the EMF noted on a potentiometer will be mainly attributable to the test ion activity. This, in turn, provides an indication of test ion concentration.

The dependence of potential change on the activity of the specific ion to be measured follows the well-known Nernst equation for a given concentration range and is related to the physical-chemical characteristics of the electrode. The Nernst equation shows:

$$E = E^\circ + \frac{RT}{nF} LnA = E^\circ + \frac{0.059}{n} \log A \ (25^\circ \text{ C.})$$

where E is the electrode potential, $E^\circ$ is a constant, $n$ is the ion charge ($\pm$) and A is the activity of the specific ion in solution.

It is apparent from the equation that a change in activity (A) equivalent to one order of magnitude causes 59 mv. potential change when the ion is univalent and about 30 mv. and 20 mv., respectively, when the ion is bivalent or trivalent. Thus, since a change in EMF represents a change in test ion activity, and since test ion activity can be related to test ion concentration, the change in EMF can be used to indicate test ion concentration.

In practice, the sensitive portion of the sensor electrode is designed in such a way as to limit the manner in which contact is made with the aqueous test solution. Care must be taken to assure that the sensitive portion of the electrode can be brought in contact with an aqueous test solution to provide an interface for sensor-test solution interaction while at the same time minimizing or preventing leakage of the sensor phase into the aqueous test solution. The useful life span of a given sensor is very dependent on how well the sensor material can be presented from substantially leaving the sensor electrode and undesirably mixing with the test solution. There are various methods for preventing such leakage and they are described under the heading Prior art.

Prior art

Presently, there are no known organic ion exchange electrodes which can directly measure the concentration of bicarbonate ions in an aqueous solution having relatively large concentrations of $Cl^-$ ions. Thus, bicarbonate concentration measurements are commonly made by indirect methods. For example, clinical $HCO_3^-$ determinations can be made by measuring pH and $PCO_2$ of a sample and then relating those values through the Henderson-Hasselbach equation to calculate $HCO_3^-$ concentration. Thus, two separate measurements and a calculation are required. Such indirect methods increase chances of error. From a strictly analytical standpoint, it is generally preferable to base a result on one measurement rather than a combination of two or more, provided all measurements are equally accurate. Further, a single measurement would be more convenient and require less measuring equipment.

It has been known for some time that amine salts and aliphatic quaternary salts, dissolved in an appropriate solvent, can be used for preparing the ion sensitive portions of liquid-anion sensor electrodes. A detailed description of one of the earliest disclosures of such electrodes can be found in United States Patent No. 3,429,-785, assigned to the same assignee as the present invention. In that patent, there is disclosed an electrode for determining the concentration of ionic species in an aqueous solution wherein the sensing portion of the electrode is a liquid organic phase containing an organic ion-exchange material capable of exchanging ions with the aqueous solution. The organic phase is described as being substantially immiscible with the aqueous solution. This property of immiscibility minimizes sensor-to-test solution leakage.

Other methods of minimizing such leakage are disclosed in United States Patent No. 3,448,032, assigned to the present assignee, and United States patent No. 3,438,886. Both of the above patents describe methods for minimizing sensor leakage by using various porous membrane materials or treated membrane materials to provide an organophilic-hydrophobic barrier between the sensor phase and an aqueous test solution.

Past attempts to make a satisfactory liquid organic ion-exchange $HCO_3^-$ electrode were unsuccessful, mainly because the $HCO_3^-$ ion, in solution, could not be measured in the presence of other anions such as $Cl^-$. For example, it was found that if an ordinary straight-chained aliphatic quaternary ammonium salt was dissolved in a suitable solvent (e.g. 1-decanol) to produce a sensor with a relatively simple composition, the resulting sensor always had a Cl⁻ over $HCO_3^-$ selectivity. This Cl⁻ selectivity is obviously a distinct disadvantage, even in test solutions containing relatively small amounts of chloride ions. For example, a 10:1 selectivity for Cl⁻ over $HCO_3^-$ means, in effect, that the maximum permissible concentration of Cl⁻ in a test solution must be less than one tenth the $HCO_3^-$ concentration before $HCO_3^-$ concentration could be accurately determined. Since $HCO_3^-$ and Cl⁻ ions are commonly found together in many aqueous systems, it was thought that a $HCO_3^-$ ion selective electrode could not be made. Quite surprisingly, I have found that such a sensor electrode can be made.

SUMMARY OF THE INVENTION

I have now made a sensor electrode which is particularly sensitive to bicarbonate ions in the presence of chloride and some other anions. With this electrode, the selectivity for $HCO_3^-$ in the presence of Cl⁻ is as great as 40:1. Thus, the electrode is capable of measuring bicarbonate ions in the presence of moderate amounts of chloride ions without the necessity for making background corrections. Further, because of the sensor materials and solvent system used, the sensor phase has a relatively high vicosity. This, in conjunction with the hydrophobicity of the sensor phase, minimizes sensor phase leakage thereby promoting longer useful electrode life.

Specifically, I have found the above electrode can be made by using a conventional liquid organic ion-exchange electrode housing of the following illustrative electrochemical cell:

Ag/AgCl, chloride solution/sensor phase/test solution/sat. calomel wherein the critical feature is the sensor phase. The preferred sensor phase comprises an organic solution consisting of a high molecular weight quaternary ammonium salt dissolved in a solvent system consisting of a trifluoroacetyl-p-alkylbenzene and preferably, an alcohol of low water solubility. The sensor and solvent system may be contained in any conventional sensor electrode body as long as provision is made for an interface between the sensor phase and the aqueous test solution. An internal reference electrode in electrical contact with the sensor phase should be provided. This internal electrode may be of any conventional type such as an Ag/AgCl electrode immersed in a chloride solution which, in turn, is in electrical contact with the sensor phase. To complete the circuit in use, an electrometer and a conventional reference electrode such as a saturated calomel reference electrode may be used.

SPECIFIC EMBODIMENTS

Figure 1:
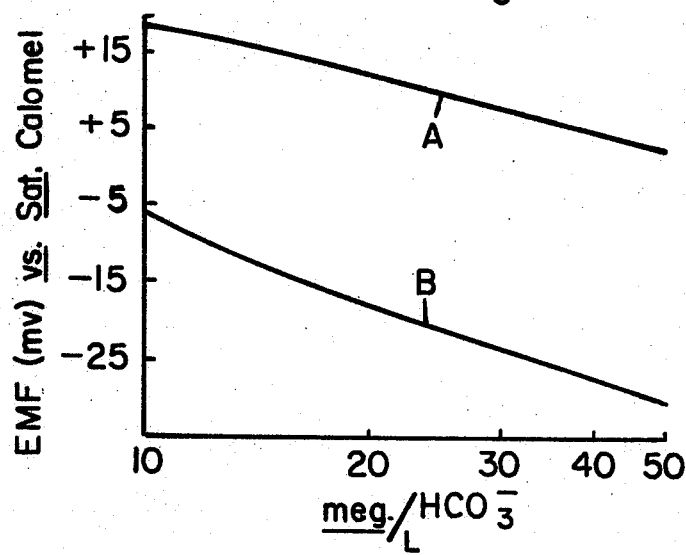
FIG. 1 is a graph relating EMF to $HCO_3^-$ concentration for two preferred electrodes of the present invention, the electrodes being designated by the letters A and B.

The operability of my electrode is based on the discovery that in order to prepare a sensor electrode with a $HCO_3^-$ over Cl⁻ selectivity, it would be necessary to exploit some characteristic that $HCO_3^-$ has, which Cl⁻ does not have. One characteristic in which these two anions differ greatly is in their strengths as conjugate bases. $HCO_3^-$ is by far the stronger of the two.

Initially, it was thought that this characteristic could be exploited through a proper selection or modification of the anion sensing material (e.g. the quaternary ammonium salts) rather than through modification of the solvent system. This initial thought was based on the earlier assumption, and in fact the teachings in the art, that the choice of solvent had little effect on electrode selectivity. It was found, however, that modification of the sensor salt material did not yield a satisfactory $HCO_3^-$ electrode. Therefore, an attempt was made to determine whether a solvent system could be found which would take advantage of the fact that $HCO_3^-$ is a stronger conjugate base than Cl⁻.

It was thought that to make a satisfactory $HCO_3^-$ sensor electrode, the solvent should have an exposed area bordering the molecule that is polarized very highly in a positive direction, so that it would solvate a strong conjugate base like $HCO_3^-$ more strongly than does water. Such a situation, it was thought, would promote $HCO_3^-$ over Cl⁻ selectivity since, as noted, Cl⁻ is a relatively weak conjugate base. However, it would also be necessary that such a molecule should have a prodigious molecular weight resulting in a low dielectric constant to prevent the sensor from having a Cl⁻ over $HCO_3^-$ selectivity. It was found that the best way to accomplish this would be to use a solvent that is the result of a chemical reaction between an organic molecule with a very strong electron-withdrawing group and a large molecule with a low dielectric constant. Then the electron-withdrawing group would create an area of high positive charge density someplace in the molecule without promoting cl⁻ over $HCO_3^-$ selectivity. These observations led to the discovery that the following solvents or solvent systems, when provided with an appropriate sensor salt, would yield a sensor electrode having a $HCO_3^-$ over Cl⁻ selectivity.

Solvent systems

Among the solvent materials which were found to have the combination of a very strong electron-withdrawing group and a low dielectric constant were the following:

trifluoroacetyl-p-butylbenzene
trifluoroacetyl-2-4-dimethylbenzene
trifluoroacetyl-p-propylbenzene
trifluoroacetyl-p-dodecylbenzene
2,6-dimethyl-4-phenyl-4-heptanol
1,1-diphenylmethanol
1-phenyl-1-(trifluoromethyl)-1-heptanol
1-phenylcyclohexanol
2-(p-fluorobenzyl)-2-octanol
2-phenyl-2-octanol
4-methyl-2-(4-fluorophenyl)-2-pentanol
n-decyltrifluoromethyl acetate
2,2,2-trifluoroethyl deconate
2,2,2-trifluoroethyl palmitate
2,2,2-trifluoroethyl-p-chlorobenzoate The choice of various trifluoroacetyl compounds was based on the following considerations. Acetic acid is a relatively weak acid but trifluoroacetic acid is as strong as some of the mineral acids. The reason for this is apparent from the fact that the trifluoromethyl group is so extremely powerful in its electron-withdrawing capability. By means of the Friedel-Crafts reaction trifluoroacetophenone can be obtained by adding trifluoroacetyl chloride to benzene, and purifying by distillation. If quaternary ammonium salt is then dissolved in this ketone, the resulting sensor has a good $HCO_3^-$ over Cl⁻ selectivity. This desired selectivity supports the conclusion that the main requirements for a good solvent are twofold; namely, that the solvent should have a strong electron-withdrawing group and such group should be part of a compound having a low dielectric constant.

It should be pointed out, however, that such a solvent is not an ideal one because of the high vapor pressure, high water solubility, and low viscosity of the solvent at room temperature. These properties result in an electrode having a relatively low life span (e.g. only about two days). These undesirable characteristics of the sensor can be avoided, however, by using a phenylaliphatic ($C_4H_9$ or greater for desired insolubility) compound instead of benzene. Then, the trifluoroacetyl group is added chiefly in the para position. When such a solvent is added to prepare the sensor, the sensor has a low vapor pressure, low water solubility, and high viscosity—properties which promote longer sensor electrode life. However, the yield of the trifluoroacetyl-p-alkylbenzene is low because the following rearrangements can occur in the presence of anhydrous AlCl₃, before all of the acyl chloride has been added:

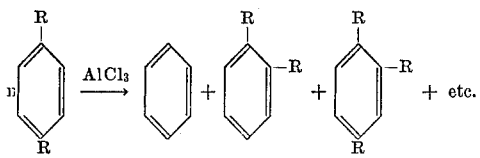

This type of rearrangement can be minimized by using CS₂ as a solvent and first cooling the mixture of CS₂ and phenylaliphatic compound to —5° C. before adding the AlCl₃. Also, for added protection, the reaction mixture is kept between 0° C. and —5° C. during the addition of all the trifluoroacetyl chloride. When these two steps are followed, the yield of trifluoroacetyl-p-aliphaticbenzene is about 40%. Using this procedure trifluoroacetyl-p-alkylbenzenes were prepared where the aliphatic group was varied from $C_2H_5$ to $C_{12}H_{25}$.

Dissolution of an appropriate quaternary ammonium salt (e.g. p-chlorobenzyltridodecylammonium chloride and the corresponding trioctyl compound) in one of these trifluoroacetyl-p-aliphaticbenzenes produced sensors that had $HCO_3^-$ over $Cl^-$ selectivities. However, it was noted that the slopes of the $HCO_3^-$ responses were quite low above $10^{-2}$ M (10 mv. per decade change in $HCO_3^-$ activity) indicating that the salt was only weakly dissociated in the solvent, producing sensors with insufficient numbers of ion exchange sites to give "Nernstian" responses of $HCO_3^-$ above $10^{-2}$ M. At the sacrifice of some $HCO_3^-$ over $Cl^-$ selectivity, some 1-decanol was added to the system to increase the dielectric constant and create more ionogenic sites. The results were an increased slope for $HCO_3^-$ plus an unexpected improvement in the electrodes stability and reproducibility in solutions containing 0.1 M NaCl. It was now apparent that by carefully choosing certain solvents that an electrode could be made available which would function as a satisfactory $HCO_3^-$ electrode in the presence of relatively greater amounts of NaCl.

Various high molecular weight alcohols were tested with the solvents to determine which alcohols would be preferable as part of a dual solvent system. The alcohols tested were 1-hexanol through 1-hexadecanol, since it was relatively easy to obtain these as they are all commercially available. The higher molecular weight alcohols ($C_{16}$) produced sensors with long response times while the lower molecular weight alcohols ($C_6$) were undesirably soluble in water. The preferred alcohol was 1-decanol, although all of the high molecular weight alcohols tested ($C_6$–$C_{12}$) resulted in operable $HCO_3^-$ sensor systems.

Because of the success found in using the trifluoroacetyl-p-aliphaticbenzenes, it was decided to determine which aliphatic group would yield the best solvent. Eight trifluoroacetyl-p-alkylbenzene compounds were synthesized with selected aliphatic groups ranging from $C_2H_5$ to $C_{12}H_{25}$. Although compounds with each of the aliphatic groups resulted in operable sensors, it was determined that, for a preferred response time and viscosity, the dodecyl aliphatic compound was ideal. One of the preferred sensor electrodes with the dodecyl compound consisted of an organic sensing phase which, by volume, had the following ingredients:

about 40% p-fluorobenzyltridodecylammonium chloride
  (listed under quaternary ammonium salts, below),
about 40% trifluoroacetyl-p-dodecylbenzene, and
about 20% decanol.

An electrode produced with a sensor phase of the above composition was very reproducible, stable, and demonstrated at 15:1 selectivity for $HCO_3^-$ over $Cl^-$.

Quaternary ammonium salts

Among the quaternary ammonium salts which were found useful for sensor electrodes having the above solvent systems were the following:

benzyltridodecylammonium chloride
N,N'-dioctadecyl-N,N,N',N'-tetramethyl-1,6-hexane-
  diammonium carbonate
N,N'bis-p-fluorobenzyl-N,N,N',N'-tetraethyl-p-xylene-
  α,α'-diammonium chloride
octadecylbenzyldimethylammonium chloride
p-fluorobenzyldiethylcyclohexylammonium chloride
p-fluorobenzyldimethyldodecylammonium chloride
p-fluorobenzylbutyldidodecylammonium chloride
p-nitrobenzyltrioctylammonium chloride
p-nitrobenzyltridodecylammonium chloride
tri-iso-pentyl-n-butylammonium chloride
tridodecyl-n-butylammonium chloride
trioctyl-n-butylammonium chloride Although all of the above quaternary ammonium salts, when mixed with the solvents discussed above, yielded sensor phases showing $HCO_3^-$ over $Cl^-$ selectivity, it was found that better solubility of the salt in the solvent was attained when the quaternary ammonium salts were tetraalkyl ammonium salts rather than salts containing both aryl and alkyl groups. It was also found that the number of total carbon atoms in the tetraalkyl compounds should be fairly evenly distributed about the nitrogen atom. However, each alkyl group should have at least three carbon atoms. Thus, the preferred tetraalkyl ammonium salt for the sensor of the present invention can be described as a tetraalkyl ammonium salt having at least about 20 total carbon atoms in the four alkyl groups with the minimum number of carbon atoms per alkyl group being at least three. The preferred minimum of about 20 total carbon atoms in the alkyl groups assures a desirable minimum water solubility. As can be seen from the above list, some of the hydrocarbon groups may be substituted (e.g. with fluoro or nitro groups).

As noted above, one of my preferred sensor phases consisted of about 2 parts p-fluorobenzyltriododecylammonium chloride (melted), 2 parts of trifluoroacetyl-p-dodecylbenzene and one part decanol. Electrodes prepared with this sensor phase demonstrated a $HCO_3^-$ over $Cl^-$ selectivity of about 15:1. However, even though the above combination yielded an electrode having $HCO_3^-$ over $Cl^-$ selectivity, it should be noted that there were found to be some slight disadvantages associated with preparing and using the electrode. For example, the quaternary ammonium salt used (p-fluorobenzyltridodecylammonium chloride) is somewhat unstable and must be stored in a dark bottle under refrigeration. (However, once the sensor phase is prepared, no signs of decomposition are apparent in the physical characteristics of the sensor or the electrodes' performances.) The sensor phase partially solidifies at room temperature. In addition, the selectivity of the electrodes for $HCO_3^-$ over $Cl^-$ is not sufficiently high to prevent changes in $Cl^-$ concentration from affecting the $HCO_3^-$ response.

It was observed that as the aliphatic chains of the ketone became longer, there was a greater tendency for the sensor phase to solidify. Thus, solvents with shorter aliphatic chains (those listed under solvents) were found to be even more preferable. However, when the aliphatic chains of the solvents were shorter than butyl, the compounds tended to be too water soluble and hence, undesirable.

By comparing the $HCO_3^-$ over $Cl^-$ selectivities of various combinations of sensor salts to solvent systems, it was found that the best overall sensor phase comprised about a 3:1:6 (volume) mixture of tri-n-octylpropylammonium chloride to octanol to trifluoroacetyl-p-butylbenzene. The above tetraalkyl quaternary ammonium salt is very stable, performs the best of those given in the list of salts, and is relatively easy to prepare. Octanol was used in place of decanol because octanol imparts a higher slope to the $HCO_3^-$ response curves. The above sensor phase demonstrated a selectivity for $HCO_3^-$ over $Cl^-$ of about 40:1. Sensor electrode selectivity for $HCO_3^-$ over $Cl^-$ was ascertained by comparing the potentials of the electrodes showed in single salt solutions and relating the EMF's to the respective concentrations, e.g., if the same EMF was obtained in 0.01 M $NaHCO_3$ as was found in .4 M NaCl, then the $HCO_3^-$ over $Cl^-$ selectivity was 40:1. FIG. 1 shows the response curves for an electrode prepared with the above sensor phase (Electrode A) and the sensor phase consisting of the preferred sensor phase and solvent system discussed under the heading Solvents (Electrode B).

Figure 2:
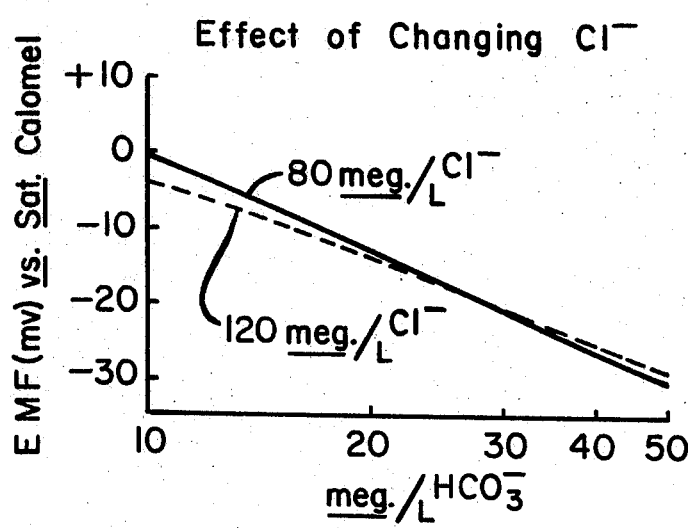
FIG. 2 is a graph relating EMF to $HCO_3^-$ concentration for one of the preferred electrodes (A) in the presence of varying amounts of Cl⁻.

FIG. 2 shows the effect of varying the amount of background NaCl from 80 to 120 meg./l. for electrode A. As can be seen, not much effect is realized between 20 and 30 meg. $HCO_3^-$/l.

Since the primary objective of the present invention is to provide an organic ion exchange sensor phase which can measure the concentration of $HCO_3^-$ in the presence of $Cl^-$ ions it is thought that the steps needed to construct the actual housing for the sensor phase need not be described in detail. Such housings are well known and do not form a basis for the present invention. Examples of how to actually construct and use the electrodes may be found in U.S. Pat. No. 3,429,785 and U.S. Pat. No. 3,448,032, both assigned to the same assignee as the present invention. The actual construction and use of such electrodes, as described in the above patents, is incorporated herein by reference.

Since the sensor phases disclosed above are subject to many modifications without departing from the scope of the present invention, it is intended that the present invention should be limited only by the appended claims.

I claim:

1. An electrode for measuring the concentration of $HCO_3^-$ in the presence of $Cl^-$ in an aqueous solution and comprising in combination:
   (a) a $HCO_3^-$ sensor phase comprising a quaternary ammonium salt selected from the group consisting of:
   hexanediammonium carbonate
   N,N'-dioctadecyl-N,N,N',N'-tetramethyl-1,6-hexanediammonium carbonate
   N,N'bis-p-fluorobenzyl-N,N,N',N'-tetraethyl-p-xylene-α,α'-diammonium chloride
   octadecylbenzyldimethylammonium chloride
   p-fluorobenzyldiethylcyclohexylammonium chloride
   p-fluorobenzyldimethyldodecylammonium chloride
   p-fluorobenzylbutyldidodecylammonium chloride
   p-nitrobenzyltrioctylammonium chloride
   p-nitrobenzyltridodecylammonium chloride
   tri-iso-pentyl-n-butylammonium chloride
   tridodecyl-n-butylammonium chloride
   trioctyl-n-butylammonium chloride and
   tri-n-octylpropyl-ammonium chloride
   (b) a solvent system for the salt of (a) comprising (1) a compound selected from the group consisting of:
   trifluoroacetyl-p-butylbenzene
   trifluoroacetyl-2-4-dimethylbenzene
   trifluoroacetyl-p-propylbenzene
   trifluoroacetyl-p--dodecylbenzene
   2,6-dimethyl-4-phenyl-4-heptanol
   1,1-diphenylmethanol
   1-phenyl-1-(trifluoromethyl)-1-heptanol
   1-phenylcyclohexanol
   2-(p-fluorobenzyl)-2-octanol
   2-phenyl-2-octanol
   4-methyl-2-(4-fluorophenyl)-2-pentanol
   n-decyltrifluoromethyl acetate
   2,2,2-trifluoroethyl deconate
   2,2,2-trifluoroethyl palmitate
   2,2,2-trifluoroethyl-p-chlorobenzoate
   and (2) an aliphatic alcohol having between six and twelve carbon atoms;
   (c) means for containing the sensor phase of (a) in the solvent system of (b) so as to provide an interface for ion exchange contact between the materials so contained and the aqueous solution; and
   (d) an internal reference electrode in electrical contact with the materials contained by (c).

2. The electrode, as claimed in claim 1, wherein the materials contain by (c) comprise by volume:
   about 40% fluorobenzyltridodecylammonium chloride,
   about 40% trifluoroacetyl-p-dodecylbenzene, and
   about 20% decanol.

3. The electrode, as claimed in claim 1, wherein the materials contained by (c) comprise a 3:1:6 (volume) mixture of tri-n-octylpropylammonium chloride, octanol, and trifluoroacetyl-p-butylbenzene.

References Cited
UNITED STATES PATENTS

| | | | |
|---|---|---|---|
| 3,445,365 | 5/1969 | Ross | 204—195 L |
| 3,448,032 | 6/1969 | Settzo et al. | 204—195 L |
| 3,671,413 | 6/1972 | Wise | 204—195 L |

GERALD L. KAPLAN, Primary Examiner

U.S. Cl. X.R.

204—1 T